(12) United States Patent
Paterour

(10) Patent No.: US 11,228,872 B2
(45) Date of Patent: Jan. 18, 2022

(54) INTEROPERABILITY DEVICE FOR INTERCONNECTING SEVERAL COMMUNICATION NETWORKS, ASSOCIATED SYSTEM AND METHOD

(71) Applicant: AIRBUS DS SLC, Elancourt (FR)

(72) Inventor: Olivier Paterour, Guyancourt (FR)

(73) Assignee: AIRBUS DS SLC, Elancourt (FR)

( * ) Notice: Subject to any disclaimer, the term of this patent is extended or adjusted under 35 U.S.C. 154(b) by 48 days.

(21) Appl. No.: 16/988,173

(22) Filed: Aug. 7, 2020

(65) Prior Publication Data

US 2021/0044937 A1    Feb. 11, 2021

(30) Foreign Application Priority Data

Aug. 8, 2019  (FR) ...................................... 1909088

(51) Int. Cl.

| H04W 4/12 | (2009.01) |
| H04W 4/08 | (2009.01) |
| H04L 9/08 | (2006.01) |
| H04W 92/02 | (2009.01) |

(52) U.S. Cl.
CPC ............. *H04W 4/08* (2013.01); *H04L 9/0819* (2013.01); *H04W 92/02* (2013.01)

(58) Field of Classification Search
CPC ........ H04W 4/08; H04W 92/02; H04W 12/04
See application file for complete search history.

(56) References Cited

U.S. PATENT DOCUMENTS

| 10,116,921 | B2* | 10/2018 | Bouazizi | ................. H04W 8/24 |
| 2017/0070868 | A1* | 3/2017 | Allen | .................. H04L 65/4061 |
| 2017/0134444 | A1 | 5/2017 | Buckley et al. | |
| 2018/0146260 | A1* | 5/2018 | Li | ........................... H04W 8/04 |

OTHER PUBLICATIONS

Search Report as issued in French Patent Application No. 1909088, dated Feb. 12, 2020.
"3rd Generation Partnership Project;Technical Specification Group Services and System Aspects; Security of Mission Critical Push To Talk (MCPTT) over LTE (Release 13)," 3GPP Standard; Technical Specification; 3GPP TS 33.179, 3rd Generation Partnership Project (3GPP), Mobile Competence Centre; 650, Route Des Lucioles ; F-06921 Sophia-Antipolis Cedex; France, vol. SA WG3, No. VI3. 9.0, Jun. 2019 (Jun. 13, 2019), pp. 1-93, XP051754078, [Retrieved on Jun. 13, 2019].

* cited by examiner

*Primary Examiner* — Michael T Vu
(74) *Attorney, Agent, or Firm* — Pillsbury Winthrop Shaw Pittman LLP

(57) ABSTRACT

An interoperability device to interconnect at least two communication networks, each including at least one local server defining and managing at least one local communication group including a plurality of local user equipment, the pluralities of user equipment having no user equipment in common, the interoperability device including s multimedia group management module, configured to: define a global communication group comprising the two local communication groups, generate and distribute an encryption key of the global communication group to the first and to the second local server, and a communication services management module configured to: manage the floor control seizure during each group communication within the global communication group and apply a network policy comprising communication rules defined by configuration.

12 Claims, 4 Drawing Sheets

INTEROPERABILITY DEVICE FOR INTERCONNECTING SEVERAL COMMUNICATION NETWORKS, ASSOCIATED SYSTEM AND METHOD

CROSS-REFERENCE TO RELATED APPLICATIONS

This application claims priority to French Patent Application No. 1909088, filed Aug. 8, 2019, the entire content of which is incorporated herein by reference in its entirety.

TECHNICAL FIELD OF THE INVENTION

The technical field of the invention is that of the interoperability of communication networks.

The present invention relates to an interoperability device of communication networks and in particular networks according to the 3GPP MCS standard.

TECHNOLOGICAL BACKGROUND OF THE INVENTION

The PMR (Professional Mobile Radio) radiocommunication standards TETRAPOL, TETRA® or P25® allow for the implementation of secure professional networks. These narrowband networks are national or local networks: they are implemented for example within an organisation such as a company, within a country for example for communications of fire services, law enforcement, military etc.

These networks are moving towards handling exchanges in the broadband. The 3GPP standard which governs mobile networks of the "GSM" type (Global System for Mobile Communications) and more particularly in deployments that make use of critical communication services defined by 3GPP called "MCS" (Mission Critical Services) allow for these secure exchanges in the broadband.

The problems that are encountered when using these networks appear during events that involve users of different networks because these users are of a different nationality or come from different organisations. It then becomes impossible for these users to communicate between them.

These problems can occur for example during a mission close to a border between two countries involving actors of the two countries: for example a mission such as a fire on the border between France and Germany involving French and German actors, for example French and German fire and/or law enforcement teams. Indeed, the German teams will then use their own German professional communication network and the French teams will use another French professional communication network. These two networks can have a different architecture and user management, and not grant the same rights to its users. For example, the German team can have rights that are higher than the rights of the French team, for example because it is more qualified. It is therefore not possible to simply interconnect a station of the German network with a station of the French network because this would pose a major risk as to the security of each one of the networks in particular due to the differences in access rights granted to the French and German teams.

These problems can also be encountered during events that involve actors from several organisations, for example from several companies, each company having its own professional communication network. On common industrial sites or during events that involve users of several organisations such as seminars, breakdowns or accidents, it can then be necessary to put into communication users of networks of several organisations without however compromising the security of each one of the interconnected networks.

There is therefore a need for a solution allowing for the interoperability of communication networks according to the 3GPP MCS standard while still retaining the level of security of each one of the communication networks.

SUMMARY OF THE INVENTION

The invention offers a solution to the problems mentioned hereinabove, by allowing for interoperability of communication networks according to the 3GPP MCS standard while still retaining control on the communications, the data and the security at the local level, i.e. by not compromising the security of each one of these networks.

An aspect of the invention thus relates to an interoperability device for interconnecting at least one first communication network according to the 3GPP MCS standard with a second communication network according to the 3GPP MCS standard, the first communication network comprising at least one first local server defining and managing at least one first local communication group comprising a first plurality of local user equipment, the second communication network comprising at least one second local server defining and managing at least one second local communication group comprising a second plurality of local user equipment, the first plurality of user equipment and the second plurality of user equipment having no user equipment in common, said interoperability device comprising:

At least one multimedia group management module, configured to:
Define at least one global communication group, said global communication group comprising at least the first local communication group of the first communication network and at least the second local communication group of the second communication network,
Generate and distribute at least one encryption key of the global communication group to the first local server and to the second local server, At least one communication services management module according to the 3GPP MCS standard, configured to:
manage the floor control seizure during each group communication within the at least one global communication group and
apply a network policy comprising communication rules, the network policy being defined by configuration.

Thanks to the invention, it is possible to interconnect two national networks without this posing any risk of security, as the interoperability device according to the invention has no knowledge of the user equipment. Indeed, an advantage of the invention is the implementation of global communication groups that comprise a plurality of groups: thus defined by configuration within the interoperability device, these groups make it possible to easily manage several pluralities of users belonging to different networks without access problems of unauthorised users to sensitive communications of the other network. Thanks to these communication groups, the interoperability device can interconnect users of different sensitive networks without the risk of a user from the first network having access to the parts of the second network to which they do not have the right to access.

Furthermore, the interoperability device according to the invention allows for a simple management of the users: the local MCS servers can already know the local communication groups and can already know how to authenticate the user equipment of these local communication groups, and the simple adding of an interoperability device of which the global communication groups have been configured to include local communication groups already configured at the local level of two networks or more to interconnect allows for communication rapidly and easily without a security risk between users of these networks. Thus, only an administrator at the local level can modify the users that belong to a local communication group, by removing or by adding, thus making it possible to retain a high level of security. This also allows for flexibility and quick intervention for example during urgent missions at the borders or during missions, for example in factories or buildings, that involve actors from different organisations. Indeed, the configuration of the global communication groups can be modifies easily to add a local communication group or to suppress one, without the users being considered by the interoperability device according to the invention but simply the local communication groups already defined at the local level. The invention has the advantage of performing the integration of a local network only one time to the interoperability device according to the invention and to then benefit from the interoperability to all the other communication networks interconnected by the interoperability device regardless of the number of interconnected networks.

In the rest of the description, the term "local" will be used to define an existing network, for example the network of an organisation or a national network. The term "global" will be used to define a network that comprises at least two local networks interconnected by the interoperability device according to the invention. Thus, a global communication will involve at least one user of each one of the two networks interconnected by the interconnection device.

In addition to the characteristics that have just been mentioned in the preceding paragraph, the interoperability device according to an aspect of the invention can have one or more complementary characteristics from among the following, taken individually or in any technically permissible combination:

the communication services management module is furthermore configured to manage all private communication between a local user equipment of the first plurality of local user equipment and a local user equipment of the second plurality of local user equipment.

the at least one global communication group defined by said multimedia group management module is a pre-arranged group or a chat group such as defined by the 3GPP MCS standard.

the at least one global communication group defined by said multimedia group management module makes it possible to use the MCPTT, MCVideo and MCData services, said MCPTT, MCVideo and MCData services being defined by the 3GPP MCS standard.

said multimedia group management module comprises at least one list of global communication groups, the at least one global communication group being included in said list of global communication groups.

Another aspect of the invention relates to a system characterised in that it comprises:

at least one interoperability device according to the invention, at least one first local server defining and managing at least one first local communication group comprising a first plurality of local user equipment, said first local server and said first plurality of local user equipment forming a first communication network, said first local server being connected to said interoperability device;

at least one second local server defining and managing at least one second local communication group comprising a second plurality of local user equipment, said second local server and said second plurality of local user equipment forming a second communication network, said second local server being connected to said interoperability device;

in that the first local server manages the authentication, the user profile, the group profile and the communication keys of each user equipment of the first plurality of local user equipment and the second local server manages the authentication, the user profile, the group profile and the communication keys of each user equipment of the second plurality of local user equipment.

In addition to the characteristics that have just been mentioned in the preceding paragraph, the system according to an aspect of the invention can have one or more complementary characteristics among the following, taken individually or in any technically permissible combination:

The system comprises a plurality of interoperability devices and in that at least one local server among the first local server and the second local server is connected to at least two interoperability devices of the plurality of interoperability devices.

selecting the interoperability device to manage a private communication coming from a local user equipment of the first plurality of local user equipment is made by the first local server according to a configuration of the first local server and in that selecting the interoperability device to manage a private communication coming from a local user equipment of the second plurality of local user equipment is made by the second local server according to a configuration of the second local server.

Another aspect of the invention relates to a method for managing communication services between a first communication network according to the 3GPP MCS standard and a second communication network according to the 3GPP MCS standard, said method being implemented by the system according to the invention and comprising at least the step of:

Establishing at least one global communication group, the global communication group comprising at least one first local communication group of the first communication network and at least the second local communication group of the second communication network, the step of establishing comprising the sub-steps of:

generating at least one encryption key of the global communication group by a multimedia group management module of an interoperability device and distributing the at least one encryption key of the global communication group, by the interoperability device, to the multimedia group management module of a first local server managing the first local communication group and to the multimedia group management module of a second local server managing the second local communication group, distributing the at least one encryption key of the global communication group, by the multimedia group management module respectively of the first local server and of the second local server, to each local user equipment respectively of the first local communication group and of the second local communication group included in the global communication group.

In addition to the characteristics that have just been mentioned in the preceding paragraph, the method for managing communication services according to an aspect of the invention can have one or more complementary characteristics from among the following, taken individually or in any technically permissible combination:

The method further comprises the step of managing the communication between the local user equipment of the global communication group comprising the first plurality of local user equipment of the first local communication group and the second plurality of local user equipment of the second local communication group, said managing of the communication being carried out by the interoperability device by managing the floor control seizure of the user equipment within the global communication group.

The method further comprises the step of selecting the interoperability device to manage a private communication, by the first local server according to a configuration of the first local server if the private communication comes from a local user equipment of the first plurality of local user equipment or by the second local server according to a configuration of the second local server if the private communication comes from a local user equipment of the second plurality of local user equipment.

The invention and its different applications shall be better understood when reading the following description and examining the accompanying figures.

BRIEF DESCRIPTION OF THE FIGURES

The figures are presented for the purposes of information and do not limit the invention in any way.

DETAILED DESCRIPTION

The figures are presented for the purposes of information and do not limit the invention in any way.

Unless mentioned otherwise, the same element appearing in different figures has a unique reference.

Figure 1:
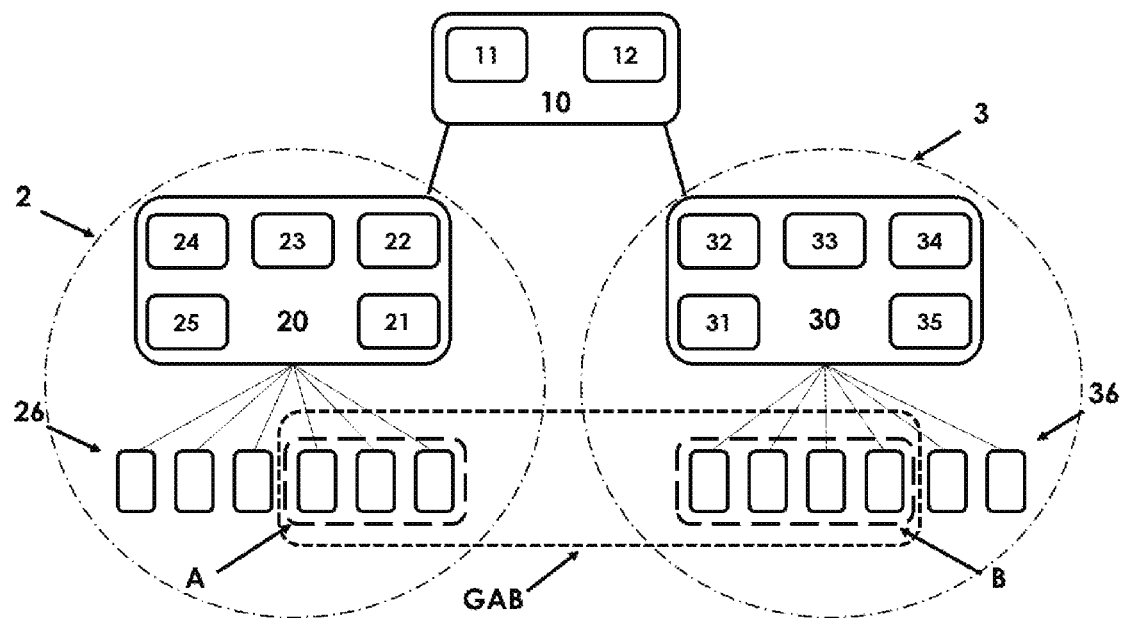
FIG. 1 diagrammatically shows a system comprising an interoperability device for two networks according to a first embodiment of the invention, FIG. 2 diagrammatically shows the distribution of an encryption key of a global communication group by the interoperability device according to the invention, FIG. 3 diagrammatically shows the routing of a private communication by an interoperability device according to the invention, FIG. 4 diagrammatically shows a system comprising an interoperability device for two networks according to a second embodiment of the invention, FIG. 5 diagrammatically shows a system comprising an interoperability device for three networks according to a third embodiment of the invention, FIG. 6 diagrammatically shows a system comprising two interoperability devices for three networks according to a fourth embodiment of the invention.

[FIG. 1] diagrammatically shows a system comprising an interoperability device for two communication networks 2 and 3 according to the 3GPP MCS standard according to a first embodiment of the invention.

"Communication network according to the 3GPP MCS standard" means a communication network compatible with the 3GPP MCS standard and more particularly with the current version of 3GPP which is version 15, with the preceding versions starting from version 13 and with the following versions that integrate all of the characteristics of the invention.

In this first embodiment of the invention shown in [FIG. 1], the system comprises an interoperability device 10 that interconnects two communication networks:

A first communication network 2 according to the 3GPP MCS standard comprising a local server 20 and a plurality of local user equipment 26.

A second communication network 3 according to the 3GPP MCS standard comprising a local server 30 and a plurality of local user equipment 36.

The first communication network 2 is interconnected to the second communication network 3 via the interoperability device 10. This interconnection can be cabled or wireless, for example satellite in the case of tactical deployment, preferably according to the server-server interface described by the 3GPP MCS standard in the 3GPP TS 23.280 (Common Functional Architecture), 23.379 (MCPTT), 23.281 (MCVideo), 23.282 (MCData), and 33.180 (MCS Security) specifications.

The first communication network 2 and the second communication network 3 can be fixed, for example communication networks that cover a company or an organisation, mobile, for example tactical, i.e. used in the case of a mission of the special forces, or a combination of these two types. For example, the first communication network 2 can be fixed and the second communication network 3 can be mobile. In another example, the second communication network 3 can be fixed and the first communication network 2 can be mobile. The two communication networks can also be fixed or can be mobile.

A user equipment of the plurality of user equipment 26 or of the plurality of user equipment 36 is for example a smartphone, a tablet or a portable computer.

The system comprises the local server 20 of the first communication network 2 which comprises at least:
  an identity management module 25 of the users of the plurality of user equipment 26,
  a user configuration management module 24,
  an encryption key management module 23,
  a multimedia group management module 22 and
  a communication services management module 21.

The system comprises the local server 30 of the second communication network 3 which comprises at least:
  an identity management module 35 of the users of the plurality of user equipment 36,
  a user configuration management module 34,
  an encryption key management module 33,
  a multimedia group management module 32 and
  a communication services management module 31.

Each identity management module, respectively 25 and 35, is configured to receive and process user authentication requests sent by the user equipment of the pluralities of user equipment, respectively 26 and 36.

Each user configuration management module, respectively 24 and 34, is configured to receive a user profile request and to send a user profile to each user equipment of the pluralities of user equipment, respectively 26 and 36, of which the authentication request is accepted by the identity management module, respectively 25 and 35, of the server, respectively 20 and 30.

Each multimedia group management module, respectively 22 and 32, is configured to receive a multimedia group profile request and send at least one multimedia group profile to each user equipment of the pluralities of user equipment, respectively 26 and 36, of which the authentication request is accepted by the identity management module, respectively 25 and 35, of the server, respectively 20 and 30. Each multimedia group management module, respectively 22 and 32, is also configured to distribute the keys of multimedia groups used to encrypt the communications within these groups.

The encryption key management module, respectively 23 and 33, is configured to receive an encryption key generation data request and send at least one piece of encryption key generation data to each user equipment of the pluralities of user equipment, respectively 26 and 36, of which the authentication request is accepted by the identity management module, respectively 25 and 35, of the server, respectively 20 and 30. The encryption key generation data received then allows the user equipment to generate its private communication encryption keys itself.

Each server, respectively 20 and 30, includes for example a transmission management module, respectively 21 and 31, this transmission management module also called FCS (Floor Control Server) in the case of the MCPTT service (Mission Critical Push To Talk), or Transmission Control in the case of the MCVideo and MCData services in the 3GPP MCS standard.

The communication services management module, respectively 21 and 31, of the server, respectively 20 and 30, is configured to manage, in a decentralised manner, the floor control seizure during an audio communication within a multimedia group wherein are affiliated user equipment registered with said server, respectively 20 and 30, and transmission control during a video communication.

In the communication network 2 shown in [FIG. 1], each user equipment of the plurality of user equipment 26 is registered with the server 20. In the communication network 3 shown in [FIG. 1], each user equipment of the plurality of user equipment 36 is registered with the server 30.

The user equipment of the plurality of user equipment 26 of the communication network 2 can communicate either via private communication between two pieces of user equipment, or via group communication between several pieces of user equipment of the plurality of user equipment 26. These group communications are carried out within communication groups defined by the multimedia group management module 22 of the local server 20. For example, in a [FIG. 1], a single communication group A is defined and allows three pieces of user equipment to communicate between them. For this, according to the 3GPP MCS standard, each user equipment of the communication group A comprises a communication group profile A received from the multimedia group management module 22. Each user equipment of the communication group A also comprises a group communication key A that allows it to communicate within the communication group A. This key was sent to each user equipment of the communication group A by multimedia group management module 22. Thus, the local server 20 defines a first communication group A in that it associates a plurality of user equipment with the communication group A. For example, this definition can be a configuration stored in memory of the local server 20.

In the same way, the user equipment of the plurality of user equipment 36 of the communication network 3 can communicate either via private communication between two pieces of user equipment, or via group communication between several pieces of user equipment of the plurality of user equipment 36. These group communications are carried out within communications groups defined by the multimedia group management module 32 of the local server 30. For example, in [FIG. 1], a single communication group B is defined and allows four pieces of user equipment to communicate between them. For this, according to the 3GPP MCS standard, each user equipment of the communication group B comprises a communication group profile B received from the multimedia group management module 32. Each user equipment of the communication group B also comprises a group communication key B that allows it to communicate within the communication group B. This key was sent to each user equipment of communication group B by multimedia group management module 32. Thus, the local server 30 defines a first communication group B in that it associates a plurality of user equipment with the communication group B. For example, this definition can be a configuration stored in memory of the local server 30.

The interoperability device 10 shown in [FIG. 1] comprises a multimedia group management module 12, configured to define at least one global communication group GAB. The multimedia group management module 12 shown in [FIG. 1] comprises a configuration storage module (not shown), such as a database. This configuration storage module comprises a configuration for the interoperability of the networks that the interoperability device 10 interconnects.

For example, in [FIG. 1], the interoperability device 10 comprises a configuration for the interoperability of the two communication networks 2 and 3. This configuration defines the global communication group GAB as comprising the two local communication groups A and B. Thus, a "definition" of the global communication group is the association of local communication groups. A global communication group can for example be defined in a configuration file stored in the configuration storage module of the multimedia group management module 12, for example in the form of a list comprising a global communication group GAB and the local communication groups A and B that the global group GAB groups together. The global communication group GAB thus comprises the local communication group A of the communication network 2 and the local communication group B of the communication network 3. The global communication group GAB can include other local communication groups. Generally, a global communication group according to the invention comprises at least two different local communication groups comprised in two different networks interconnected by the interoperability device 1. Thanks to this global communication group GAB, the users of the user equipment of groups A and B can communicate between them, for example in the case of a mission that involves these users.

A global communication group GAB can be a pre-arranged group or a chat group such as defined by the 3GPP MCS standard.

An advantage of the global communication groups is that they make it possible to propose the same services as the local groups that they include. Thus, a global communication group such as the group GAB is capable of proposing the MCPTT "Push-To-Talk", MCVideo video and MCData data services, the MCPTT, MCVideo and MCDATA services being defined by the 3GPP MCS standard Another advantage of the invention is that with the adding of the interoperability device 10 between two communication networks 2 and 3, it is possible to interconnect these two networks without posing any security risks. Indeed, only the users of the authorised local groups A and B of each one of the two networks 2 and 3 will be able to communicate between them. The local groups A and B are authorised to communicate by configuration, the configuration being stored in the configuration storage module of the multimedia group management module 12. A user of which the user equipment does not belong to any of these two local communication groups A and B therefore will not be able to communicate with any user of which the user equipment belongs to the other network. For example, a user equipment belonging to the local communication network 2 but not belonging to the local communication group A will not be able to communicate with any of the user equipment of the plurality of user equipment 36 of the local communication network 3. Recall that "local communication network" means an existing communication network, interconnected with another exiting communication network by the interoperability device 10. Thus, a "global communication network" comprises at least two local communication networks and an interoperability device 10 according to the invention. Recall that "global communication group" means a communication group comprising at least one communication group of a first communication network and at least one communication group of a second communication network interconnected with the first communication network by the interoperability device 10.

The multimedia group management module 12 of the interoperability device 10 is furthermore configured to generate and distribute at least one encryption key K of the global communication group GAB to the communication group management module 22 of the first local server 20 and to the communication group management module 32 of the second local server 30.

Figure 2:
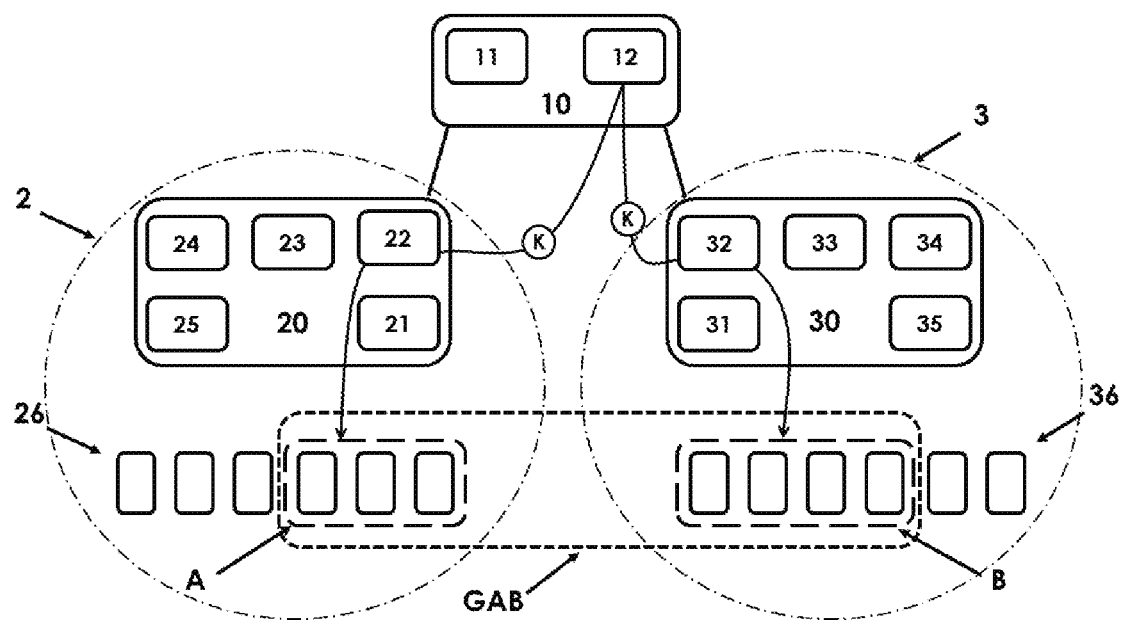

[FIG. 2] diagrammatically shows the distribution of an encryption key of a global communication group by the interoperability device 10 according to the invention.

As shown in [FIG. 2], the multimedia group management module 12 of the interoperability device 10 distributes an encryption key K of the global communication group GAB. The encryption key K is automatically generated by a symmetric key generation algorithm implemented by the multimedia group management module 12. It can then be stored in the configuration storage module of the multimedia group management module 12. The generating of this key takes place at the global level, i.e. it is carried out by the interoperability device 10 that acts as a "neutral" entity in the relations between the interconnected communication networks, which makes it possible to minimise the security risks: the key is not generated by any local communication network, and none of these interconnected networks therefore has control on generating the encryption key K, allowing for equal rights and a guarantee of equal treatment between the interconnected networks.

As shown in [FIG. 2], the encryption key K of the global communication group GAB, after having been generated and stored in the configuration storage module of the multimedia group management module 12, is distributed according to 3GPP MCS, which describes the server-server interface, to the multimedia group management modules 22 and 32 of the two interconnected local servers 20 and 30. Each local server 20 and 30 then distributes to the user equipment belonging to the global communication group GAB the communication key K received from the interoperability device 10. For this, the local servers 20 and 30 already know the user equipment belonging to the local communication groups defined by their multimedia group management module 22 and 32. Indeed, when an interoperability device 10 is set up to interconnect two communication networks and define at least one global communication group comprising different local communication groups, the interoperability device 10 sends at least one piece of information to each user configuration management module 24 and 34 of each local server 20 and 30 comprising the local communication groups belonging to the defined global group. Each user configuration management module 24 and 34 then stores in the group profile local communication groups belonging to the defined global group, for example in the profile of the local groups A and B, the information received from the interoperability device 10 as well as an identifier of the interoperability device 10 that defined this global group GAB.

Once in possession of the encryption key K of the global communication group GAB, the user equipment is in a position to carry out global group communications GAB. All group communication is routed via the interoperability device 10 to manage the floor control seizure during each group communication within the global communication group GAB and to apply a network policy comprising communication rules.

For this, the interoperability device 10 comprises a communication services management module 11 according to the 3GPP MCS standard, configured to manage the floor control seizure during each group communication within the global communication group GAB. This makes it possible to resolve the security problems that would arise if one of the two local servers 20 or 30 was in charge of managing the floor control seizure during group communications within the global communication group GAB, having then the possibility of favouring the user equipment of one communication network or the other. In this invention, floor control seizure is managed by the communication services management module 11 of the interoperability device 10 so as to have a "neutral" entity in charge of security in a substantial security risk context.

The communication services management module 11 of the interoperability device is furthermore configured to apply a network policy comprising communication rules, the network policy being defined by configuration. This network policy can for example be elaborated in a configuration file stored in the configuration storage module of the multimedia group management module 12. Alternatively, this configuration file can be stored in a configuration storage module of the communication services management module 11 (not shown).

The network policy can include the authorisation of certain services only. For example, the network policy can define that only group communications are authorised. The network policy can further define that no private communication is authorised. The network policy can also authorise only certain services defined by the 3GPP MCS standard, for example that only the MCPTT and MCData services are authorised but not the MCVideo service. The network policy can further define a limit of the duration of the floor control seizure of each user equipment. The network policy can also include other rules that are not specified here.

Figure 3:
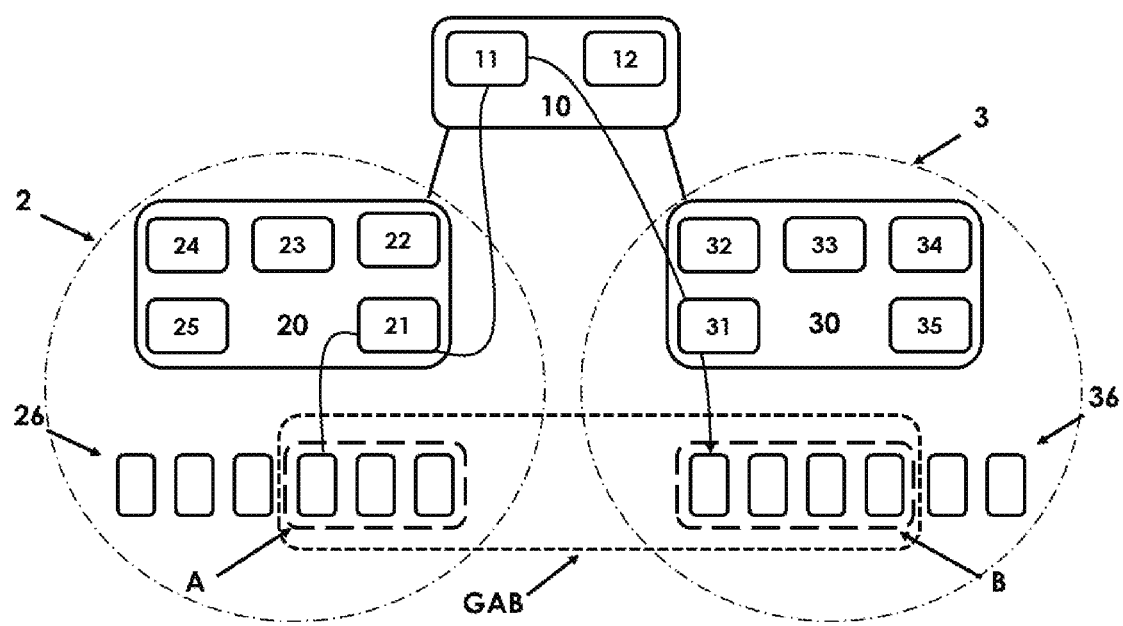

[FIG. 3] diagrammatically shows the routing of a private communication by an interoperability device according to the invention.

According to the invention, all of the private communications between two pieces of user equipment belonging to two different communication networks interconnected by the interoperability device 10 according to the invention are routed via the interoperability device 10 according to the invention. This allows the interoperability device 10 to perform its function of manager of the security of the interconnection between the two networks and to prevent the communication between a user equipment of the communication network 2 and a user equipment of the communication network 3 with which it does not have the right to communicate. This also makes it possible to add an additional level of security, with each one of the local servers 20 and 30 applying its local network policy already defined and therefore always being manager of the security of its communication network at the local level.

For example, a user equipment of the communication network 2 carries out a request for private communication with a user equipment of the communication network 3 with the local server 20. The local server 20 relays this request to the interoperability device 10 according to the invention which then verifies, according to the network policy that it stores, if the request is in line with the communication rules of the network policy. For example, the interoperability device 10 checks that private communications between the communication network 23 and the communication network 3 are authorised. Private communications can be of different natures: MCPTT, MCVideo and MCData. In the MCData service type, message receipt acknowledgements but also read acknowledgements can be managed according to the network policy comprise in the interoperability device 10. Thanks to this, the security of each one of the networks is maintained, the network policy defined at interoperability device 10 supplanting the network policy of each one of the local servers 20 and 30. It is therefore easier to modify the network policy at interoperability device 10 because it is not necessary to modify it at each local server 20 and 30. Furthermore, this allows for neutrality in the management of network policies, so as to not have a stricter network policy in one network than in the other, but rather to have a harmonised and systematically applied network policy.

Figure 4:
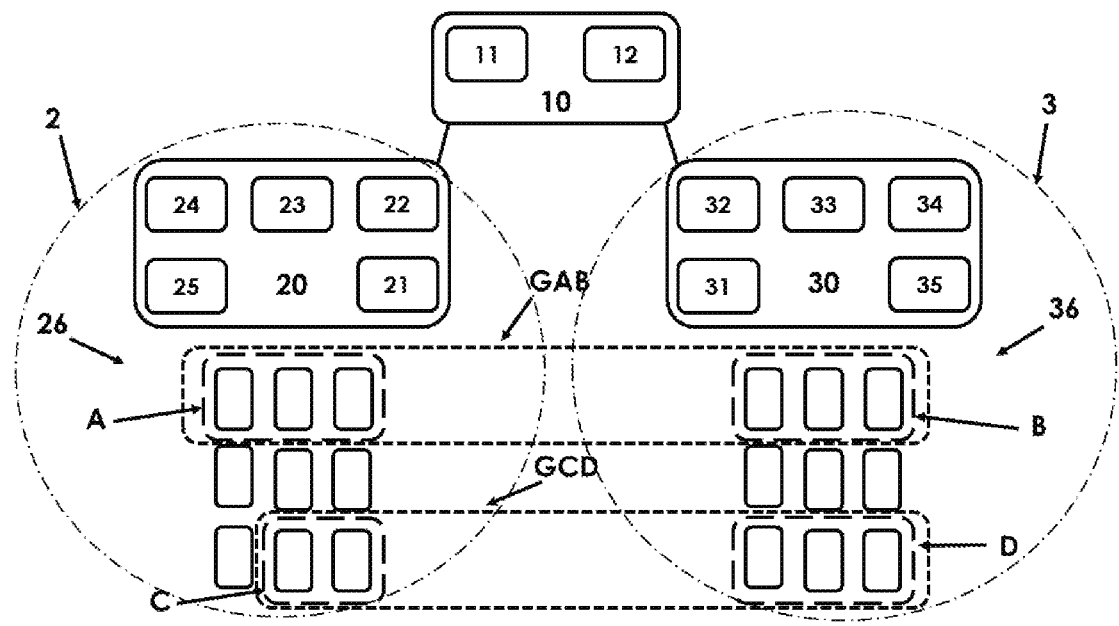

[FIG. 4] diagrammatically shows a system comprising an interoperability device for two networks according to a second embodiment of the invention.

In [FIG. 4], the interoperability device 10 defines two global communication groups GAB and GCD.

The multimedia group management module 22 of the local server 20 defines two communication groups A and C. The group A allows three pieces of user equipment to communicate between them and the group C allows two pieces of user equipment to communicate.

In the same way, the multimedia group management module 32 of the local server 30 defines two communication groups B and D. The two local communication groups B and D each allow three pieces of user equipment to communicate between them.

In the second embodiment shown in [FIG. 4], the interoperability device 10 defines two global communication groups. The first global communication group GAB comprises the two local communication groups A and B and thus allows six pieces of user equipment to communicate between them: three pieces of user equipment of the communication network 2 and three pieces of user equipment of the communication network 3. The second global communication group GCD comprises the two local communication groups C and D and thus allows five pieces of user equipment to communicate between them: two pieces of user equipment of the communication network 2 and three pieces of user equipment of the communication network 3.

This second embodiment makes it possible for example to retain a sufficient level of security by allowing to talk between them only the users of communication networks 2 and 3 that have the same level of rights. For example, the user equipment belonging to the local communication group A can have the same level or rights or grade as the user equipment belonging to the local communication group B, or an equivalent level of rights or grade. In the same way, the user equipment belonging to the local communication group C can have the same level of rights or grade as the user equipment belonging to the local communication group D, or an equivalent level of rights or grade, with this level of rights or grade being for example greater than the level of rights or grade of the user equipment of the local communication groups A and B and therefore of the global communication group GAB.

Figure 5:
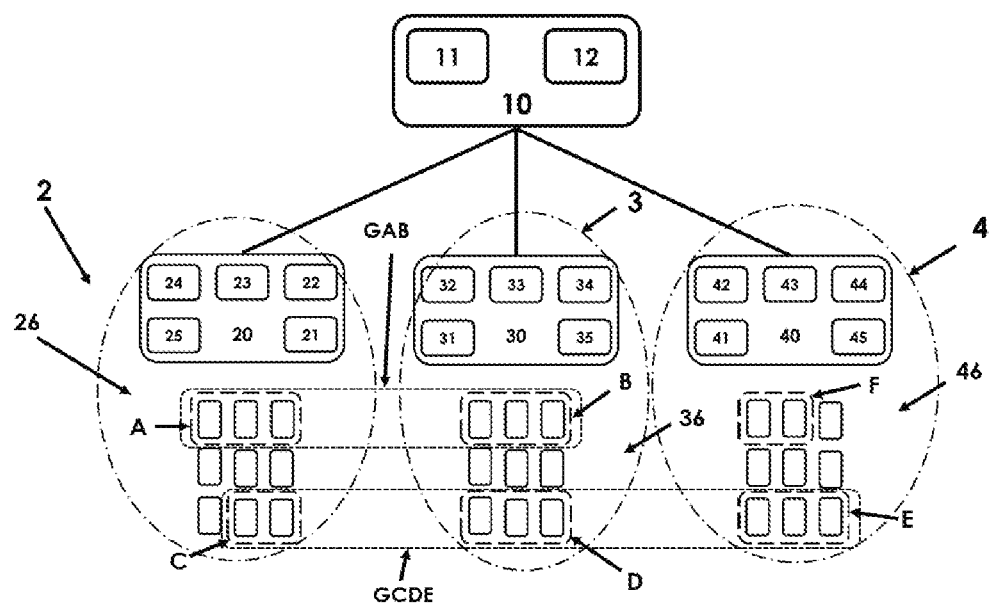

[FIG. 5] diagrammatically shows a system comprising an interoperability device for three networks according to a third embodiment of the invention.

In [FIG. 5], the interoperability device 10 interconnects three local communication networks 2, 3 and 4. Each network comprises a local server 20, 30 and 40.

Each local server, respectively 20, 30 and 40, comprises at least:
- an identity management module, respectively 25, 35 and 45, of the plurality of user equipment, respectively 26, 36 and 46,
- a configuration management module, respectively 24, 34 and 44,
- an encryption key management module, respectively 23, 33 and 43,
- a multimedia group management module, respectively 22 33 and 43 and
- a communication services management module, respectively 21, 31 and 41.

The multimedia group management module 22 of the local server 20 defines two communication groups A and C. The group A allows three pieces of user equipment to communicate between them and the group C allows two pieces of user equipment to communicate.

In the same way, the multimedia group management module 32 of the local server 30 defines two communication groups B and D. The two local communication groups B and D each allow three pieces of user equipment to communicate between them.

In the same way, the multimedia group management module 42 of the local server 40 defines two communication groups E and F. The group D allows three pieces of user equipment to communicate between them and the group F allows two pieces of user equipment to communicate.

In the third embodiment shown in [FIG. 5], the interoperability device 10 interconnects three communication networks 2, 3 and 4 and defines two global communication groups. The first global communication group GAB comprises the two local communication groups A and B and thus allows six pieces of user equipment to communicate between them: three pieces of user equipment of the communication network 2 and three pieces of user equipment of the communication network 3. The second global communication group GCDE comprises the three local communication groups C, D and E and thus allows eight pieces of user equipment to communicate between them: two pieces of user equipment of the communication network 2, three pieces of user equipment of the communication network 3 and three pieces of user equipment of the communication network 4.

This third embodiment makes it possible for example to retain a sufficient level of security by not authorising certain users of the networks 2 and 3 to communicate with users of the network 4 while still being able to communicate between them. This is the case of the global communication group GAB, which allows only user equipment of the groups A and B to communicate between them and which does not allow them to communicate with the network 4. Furthermore, the global communication group GCDE allows user equipment of the three networks 2, 3 and 4 to communicate between them while still guaranteeing that the user equipment of the groups A and B of the networks 2 and 3 will not be able to communicate with any user equipment of the network 4. The interoperability device 10 thus allows for a partitioning and a total control of the group communication between user equipment 26, 36 and 46 and between communication networks 2, 3 and 4, while still leaving the local servers 10, 20 and 30 the management of user equipment 26, 36 and 46 and therefore by not compromising the security of the entire system if the interoperability device 10 were to be compromised: the latter has no knowledge of any information concerning the user equipment 26, 36 and 46.

Figure 6:
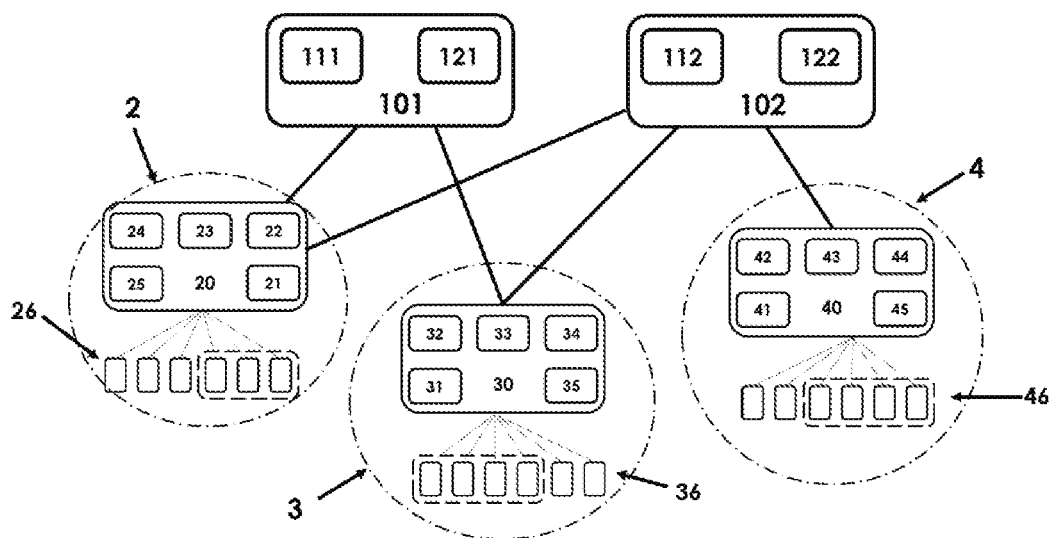

[FIG. 6] diagrammatically shows a system comprising two interoperability devices for three networks according to a fourth embodiment of the invention.

In this fourth embodiment shown in [FIG. 6], the system comprises two interoperability devices 101 and 102 according to the invention.

A first interoperability device 101 interconnects two communication networks 2 and 3. This first interoperability device 101 makes it possible to apply a first network policy between these two networks 2 and 3, for example a flexible network policy.

A second interoperability device 102 interconnects three communication networks 2, 3 and 4 and makes it possible to apply a second network policy, for example a strict network policy.

Thus, it is possible to define global communication groups that comprise different network policy levels according to the networks that they cover. It is possible to define that when user equipment of the communication networks 2 and 3 communicate between them, a flexible network policy is to be applied, although when user equipment of the networks 2, 3 and 4 communicate between them, a stricter network policy is to be applied, because the communications of the user equipment of the networks 2, 3 and 4 can be more sensitive than when user equipment of the networks 2 and 3 alone communicate between them.

Figure 7:
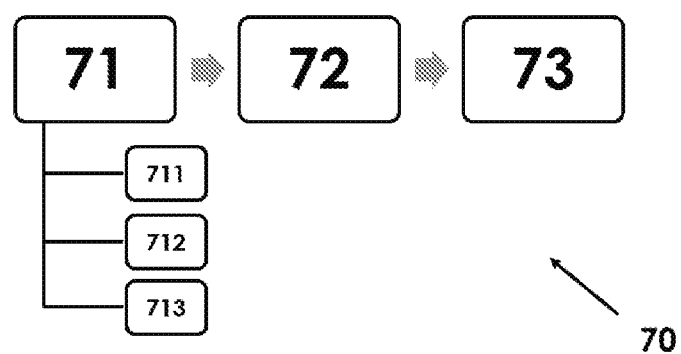
FIG. 7 diagrammatically shows a method for managing communication services implemented by the system according to the invention.

[FIG. 7] diagrammatically shows a method for managing communication services between two communication networks implemented by the system according to the invention.

The method for managing communication services 70 comprises a first step 71 of establishing a global communication group. The method is for example implemented in the system shown in [FIG. 1] and comprising a communication network 2 and a communication network 3, the network 2 comprising a local communication group A and the network 3 comprising a local communication group B.

This step 71 of establishing a global communication group, the global communication group GAB is established and comprises at least one first local communication group A of the communication network 2 and at least one local communication group B of the communication network 3.

The step 70 of establishing a global communication group comprises the sub-steps of:
    generating 711 at least one encryption key K of the global communication group GAB by the interoperability device 10. This sub-step 711 is carried out by the multimedia group management module 12 of the interoperability device 10.
    distributing 712 the encryption key K of global communication group GAB, by the interoperability device 10, to the communication group management module 22 of the local server 20 managing the local communication group A and to the communication group management module 32 of the local server 30 managing the local communication group B. This sub-step 712 is carried out by the multimedia group management module 12 of the interoperability device 10.
    distributing 713 the encryption key K of global communication group GAB, by the multimedia group management module 22 and 32 respectively of the local server 20 and of the local server 30, to each local user equipment respectively of the local communication group A and of the local communication group B included in the global communication group GAB.

The method for managing communication services 70 further comprises a second step 72 of managing the communication between the local user equipment of the global communication group GAB comprising the first plurality of local user equipment of the local communication group A and the second plurality of local user equipment of the local communication group B. The management of the communication is carried out by the interoperability device 10 and in particular by its communication services management module 11 by managing the floor control seizure of the user equipment within the global communication group GAB.

The method for managing communication services 70 further comprises a second step 73 of selecting the interoperability device 10 to manage a private communication, by the local server 20 according to a configuration of the local server 20 if the private communication comes from local user equipment of the plurality of local user equipment 26 or by the local server 30 according to a configuration of the local server 30 if the private communication comes from local user equipment of the plurality of local user equipment 36. The configuration is known by each local server 20 and 30 because the interoperability device 10 previously sent to them the configuration of global communication groups that the interoperability device 10 defines.

The invention claimed is:

1. An interoperability device for interconnecting at least one first communication network according to the 3GPP MCS standard with a second communication network according to the 3GPP MCS standard, the first communication network comprising at least one first local server defining and managing at least one first local communication group comprising a first plurality of local user equipment, the second communication network comprising at least one second local server defining and managing at least one second local communication group comprising a second plurality of local user equipment, the first plurality of user equipment and the second plurality of local user equipment having no local user equipment in common, said interoperability device comprising:
    at least one multimedia group management module, configured to:
        define at least one global communication group, said global communication group comprising at least the first local communication group of the first communication network and at least the second local communication group of the second communication network,
        generate and distribute at least one encryption key of the global communication group to the first local server and to the second local server, at least one communication services management module according to the 3GPP MCS standard, configured to:
    manage the floor control seizure during each group communication within the at least one global communication group; and
    apply a network policy comprising communication rules, the network policy being defined by configuration.

2. The interoperability device according to claim 1, wherein the communication services management module is further configured to manage all private communication between a local user equipment of the first plurality of local user equipment and a local user equipment of the second plurality of local user equipment.

3. The interoperability device according to claim 1, wherein the at least one global communication group defined by said multimedia group management module is a pre-arranged group or a chat group.

4. The interoperability device according to claim 3, wherein the pre-arranged group or chat group is defined by the 3GPP MCS standard.

5. The interoperability device according to claim 1, wherein the at least one global communication group defined by said multimedia group management module makes it possible to use the MCPTT, MCVideo and MCData services, said services MCPTT, MCVideo and MCData being defined by the 3GPP MCS standard.

6. The interoperability device according to claim 1, wherein said multimedia group management module comprises at least one list of global communication groups, the at least one global communication group being included in said list of global communication groups.

7. A system comprising:
at least one interoperability device for interconnecting at least one first communication network according to the 3GPP MCS standard with a second communication network according to the 3GPP MCS standard, the first communication network comprising at least one first local server defining and managing at least one first local communication group comprising a first plurality of local user equipment, the second communication network comprising at least one second local server defining and managing at least one second local communication group comprising a second plurality of local user equipment, the first plurality of user equipment and the second plurality of local user equipment having no local user equipment in common, said interoperability device comprising:
    at least one multimedia group management module, configured to:
define at least one global communication group, said global communication group comprising at least the first local communication group of the first communication network and at least the second local communication group of the second communication network,
generate and distribute at least one encryption key of the global communication group to the first local server and to the second local server,
at least one communication services management module according to the 3GPP MCS standard, configured to:
manage the floor control seizure during each group communication within the at least one global communication group; and
apply a network policy comprising communication rules, the network policy being defined by configuration,
said at least one first local server defining and managing said at least one first local communication group comprising said first plurality of local user equipment, said first local server and said first plurality of local user equipment forming said first communication network, said first local server being connected to said interoperability device;
said at least one second local server defining and managing said at least one second local communication group comprising said second plurality of local user equipment, said second local server and said second plurality of local user equipment forming said second communication network, said second local server being connected to said interoperability device;
wherein the first local server manages the authentication, the user profile, the group profile and the communication keys of each user equipment of the first plurality of local user equipment and the second local server manages the authentication, the user profile, the group profile and the communication keys of each user equipment of the second plurality of local user equipment.

8. The system according to claim 7, comprising a plurality of interoperability devices and wherein at least one local server among the first local server and the second local server is connected to at least two interoperability devices of the plurality of interoperability devices.

9. The system according to claim 8, wherein a selection of an interoperability device to manage a private communication coming from a local user equipment of the first plurality of local user equipment is made by the first local server according to a configuration of the first local server and wherein a selection of another interoperability device to manage a private communication coming from a local user equipment of the second plurality of local user equipment is made by the second local server according to a configuration of the second local server.

10. A method for managing communication services between a first communication network according to the 3GPP MCS standard and a second communication network according to the 3GPP MCS standard with an interoperability device for interconnecting the first communication network and the second communication network, the first communication network comprising at least one first local server defining and managing at least one first local communication group comprising a first plurality of local user equipment, the second communication network comprising at least one second local server defining and managing at least one second local communication group comprising a second plurality of local user equipment, the first plurality of user equipment and the second plurality of local user equipment having no local user equipment in common, said method and comprising:
defining, with at least one multimedia group management module of the interoperability device, at least one global communication group, said global communication group comprising at least the first local communication group of the first communication network and at least the second local communication group of the second communication network,
establishing the at least one global communication group, the step of establishing comprising the sub-steps of:
generating at least one encryption key of the global communication group by the multimedia group management module of the interoperability device; and
distributing the at least one encryption key of the global communication group, by the interoperability device, to the multimedia group management module of the first local server managing the first local communication group and to the multimedia group management module of the second local server managing the second local communication group, distributing the at least one encryption key of the global communication group, by the multimedia group management module respectively of the first local server and of the second local server, to each local user equipment respectively of the first local communication group and of the second local communication group included in the global communication group, managing, by a communication services management module of the interconnection device, the floor control seizure during each group communication within the at least one global communication group and applying, by the communication services management module of the interconnection device, a network policy comprising communication rules, the network policy being defined by configuration.

11. The method for managing communication services according to claim 10, further comprising:

managing the communication between the local user equipment of the global communication group comprising the first plurality of local user equipment of the first local communication group and the second plurality of local user equipment of the second local communication group, said managing of the communication being carried out by the interoperability device by managing the floor control seizure of the user equipment within the global communication group.

12. The method for managing communication services according to claim 10, further comprising:

selecting the interoperability device to manage a private communication, by the first local server according to a configuration of the first local server if the private communication comes from a local user equipment of the first plurality of local user equipment or by the second local server according to a configuration of the second local server if the private communication comes from a local user equipment of the second plurality of local user equipment.

* * * * *